United States Patent
Cawley et al.

(10) Patent No.: US 9,934,532 B2
(45) Date of Patent: Apr. 3, 2018

(54) SMART ORDER ROUTER

(71) Applicants: James Cawley, New York, NY (US); Christopher Koppenheffer, Riverside, CT (US)

(72) Inventors: James Cawley, New York, NY (US); Christopher Koppenheffer, Riverside, CT (US)

(73) Assignee: Javelin Capital Markets LLC, New York, NY (US)

( * ) Notice: Subject to any disclaimer, the term of this patent is extended or adjusted under 35 U.S.C. 154(b) by 89 days.

(21) Appl. No.: 13/622,468

(22) Filed: Sep. 19, 2012

(65) Prior Publication Data
US 2014/0081794 A1 Mar. 20, 2014

(51) Int. Cl.
*G06Q 30/00* (2012.01)
*G06Q 30/08* (2012.01)
*G06Q 40/04* (2012.01)

(52) U.S. Cl.
CPC ............. *G06Q 30/08* (2013.01); *G06Q 40/04* (2013.01)

(58) Field of Classification Search
CPC .......................................... G06Q 30/06–30/08
USPC ................................. 705/26.1–27.2
See application file for complete search history.

(56) References Cited

U.S. PATENT DOCUMENTS

| | | | |
|---|---|---|---|
| 6,988,084 B1* | 1/2006 | DiBacco | 705/38 |
| 7,680,715 B2 | 3/2010 | Waelbroeck et al. | |
| 7,895,117 B2 | 2/2011 | Alsberg et al. | |
| 7,953,650 B2 | 5/2011 | Corvin | |
| 2001/0032162 A1* | 10/2001 | Alsberg et al. | 705/37 |
| 2003/0046197 A1* | 3/2003 | Corvin | 705/35 |
| 2007/0005484 A1* | 1/2007 | Waelbroeck et al. | 705/37 |
| 2009/0125449 A1* | 5/2009 | Levering et al. | 705/36 R |
| 2012/0047061 A1* | 2/2012 | Harris et al. | 705/37 |

OTHER PUBLICATIONS

"Bloomberg Trading Platform for Singapore Bonds Launched" (AsiaPulse News, May 30, 2006) https://dialog.proquest.com/professional/docview/677591556?accountid=142257.*
International Search Report and Written Opinion of the International Searching Authority for International Application No. PCT/US12/68737 dated Mar. 4, 2013.

* cited by examiner

*Primary Examiner* — Ethan D Civan
(74) *Attorney, Agent, or Firm* — Fish & Richardson P.C.

(57) ABSTRACT

Methods, systems, and apparatus, including computer programs encoded on computer storage media, for order routing. One of the methods includes receiving a request for quote from a user, the request for quote indicating that the first user is to be anonymous during the negotiation. The method also includes selecting counterparties to receive the request for quote. The method also includes sending the request for quote to the selected counterparties absent revealing the identity of the user. The method also includes receiving prices from the counterparties, each price associated with a counterparty. The method also includes presenting the prices to the user.

17 Claims, 7 Drawing Sheets

SMART ORDER ROUTER

BACKGROUND

This specification relates to swaps.

Swaps are financial derivatives in which counterparties to the transactions exchange certain benefits of one party's financial instrument for those of the other party's financial instrument. Two examples of financial swaps are Interest Rate Swaps and Credit Default Swaps. Interest rate swaps are a financial derivative in which one party agrees to pay a fixed interest rate on a notional amount to a second party in exchange for receiving a floating interest rate on a notional amount. Interest rate swaps can be denoted in a single currency or multiple currencies. Credit Default Swaps are a financial derivatives in which one party, who is the buyer of credit protection, makes a series of payments to other party, who is the seller of credit protection, regarding an underlying bond or loan, in exchange for the seller's agreement to make payment on the underlying bond or loan if there is a credit event that causes it to go into default.

Securities can be traded on electronic exchanges. Securities traded over exchanges are standardized to allow for transparent trading. Less standard derivatives are traded in an over-the-counter (OTC) derivatives market. OTC derivatives are currently traded bilaterally between two parties.

SUMMARY

In general, one innovative aspect of the subject matter described in this specification can be embodied in methods that include the actions of receiving a request for quote from a user, the request for quote indicating that the first user is to be anonymous during the negotiation. The methods also include the actions of selecting counterparties to receive the request for quote. The methods also include the actions of sending the request for quote to the selected counterparties absent revealing the identity of the user. The methods also include the actions of receiving prices from the counterparties, each price associated with a counterparty. The methods also include the actions of presenting the prices to the user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination the methods may include the actions of verifying the request for quote is clearable. The methods may include the actions of verifying that the user is authorized to trade a notional amount. The request for quote may include the notional amount. The methods may include the actions of receiving an acceptance of one of the prices from the user and executing a transaction based on the accepted price. Executing the transaction may include sending a buy ticket to a clearing house and sending the sell ticket to a clearing house. The methods may include the actions of revealing the identity of the user to the counterparty associated with the accepted price. The identity of at least one counterparty associated with a quote may not be revealed to the user. The methods may include the actions of presenting non-identifying information about the user to each counterparty. The non-identifying information may include a ratio of a historic number of executed transactions to a historic number of submitted requests for quote. The methods may include the actions of presenting a count of the selected counterparties. Selecting counterparties to receive the request for quote may include selecting a counterparty based on a historic performance metric of that counterparty. The historic performance metric may be a moving average of usage fees generated by the counterparty. The historic performance metric may be a moving average of volume traded by the counterparty. Presenting the prices may include determining, for each price, a financial advantage provided to the user by the respective price, and presenting prices in a sorted order, the sorted order determined at least in part by a financial advantage of the corresponding price. Presenting the price may include determining that a first price associated with a first counterparty and a second price associated with the second counterparty offer the same financial advantage, and ordering the prices based on a historic performance metric of the first counterparty and a historic performance metric of the second counterparty. The request for quote may be a bespoke transaction.

Particular embodiments of the subject matter described in this specification can be implemented so as to realize one or more of the following advantages. First, traders and market makers can consummate swap transactions anonymously. Trade anonymity is currently not available for swap transactions. Customers can now achieve best execution without revealing their identity.

Second, the system is equipped with smart order routing logic designed to automatically direct orders to top market makers in each specified sector of a given swap market.

Third, the system provides market makers with statistical measures mapped to disclose how many times the requesting party acted upon a quoted swap price in the system.

Fourth, the system maintains real time data on an open line of communication that instantaneously refreshes with live actionable prices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates a sample user interface for creating a request for a quote.

FIG. 6 illustrates an example of a user interface displaying request for quote.

FIG. 7 illustrates an example of a user interface displaying incoming prices to a requesting user.

Like reference numbers and designations in the various drawings indicate like elements.

DETAILED DESCRIPTION

In the over-the-counter (OTC) market financial markets buyers may initiate transactions through a request for quote ("RFQ"). A RFQ is the process where the requestor asks a market maker to quote a price for the swap the requestor wishes to transact. A quote is not the same price; one can consummate a transaction and the other cannot. A quote is an indication of where something may trade and cannot consummate a transaction. A price is a firm actionable level that can be traded against and thereby consummates a transaction. In response to the RFQ, the market maker provides the requestor with a quote. If the requestor wishes to act upon that quote and consummate the transaction then the requestor verifies with the market maker that the level quoted is still available. The RFQ process makes it possible for the requestor to approach multiple market makers until the requestor receives a price indication that the requestor deems to be the best price. If the requestor reveals their identity they also reveal their market direction and size. Such disclosure may adversely affect the price at which the transaction can be consummated and limit the number of market makers that can be queried. Therefore, it is advantageous for a requestor to conceal this information.

Figure 1:
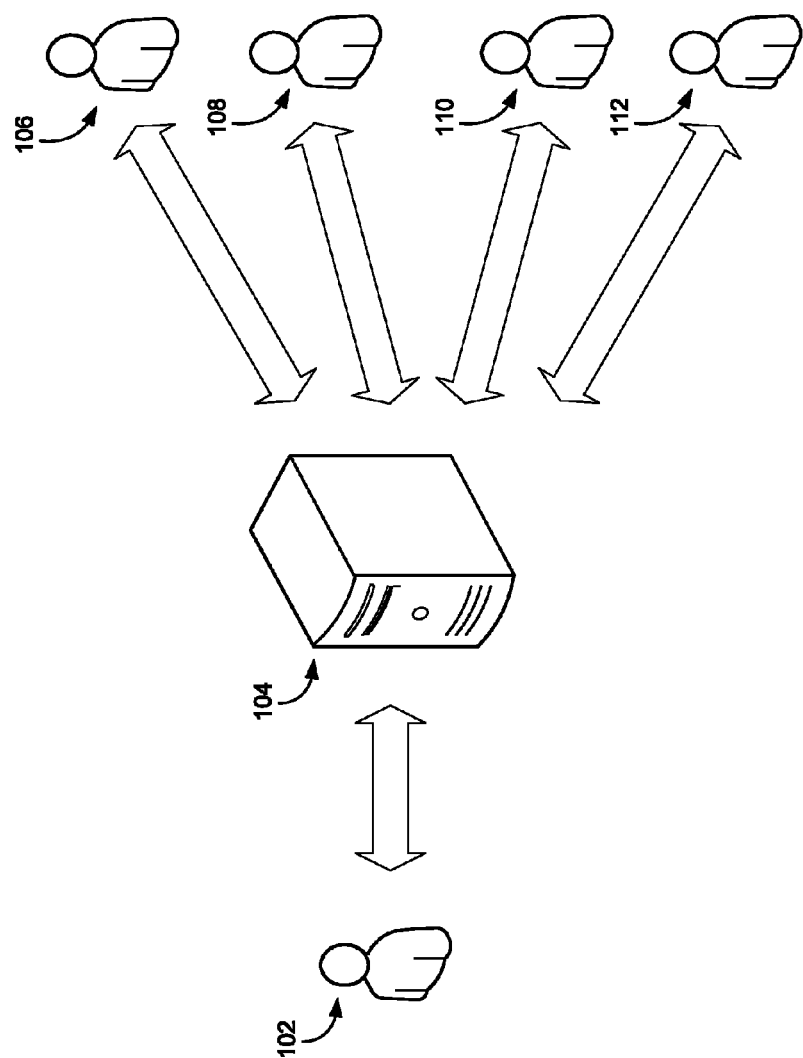
FIG. 1 illustrates a requestor requesting a price for an interest rate swap.

FIG. 1 is an illustration of a requestor 102 requesting a price for a swap. For example, an interest rate swap is a financial derivative whereby two parties agree to exchange a fixed interest rate on a notional amount for floating interest rate on a notional amount. In general, the floating interest rate is determined by a standard benchmark such as the London Interbank Offer Rate (LIBOR). The fixed interest rate portion of the interest rate swap is referred to as the fixed leg and the floating interest rate portion of the interest rate swap is referred to as the floating leg. Swaps are generally not considered standardized but are bespoke transactions that include terms which are agreed upon during a bilateral negotiation.

The notional amount associated with the fixed interest rate is usually, but does not have to be, the same as the notional amount associated with the floating interest rate. In some scenarios, the notional amount associated with the fixed interest rate is denominated in a different currency than the notional amount associated with the floating interest rate. For example, the notional amount for the fixed interest rate could be denominated in United States dollars while the notional amount for the floating interest rate could be denominated in British Pounds.

When the requestor 102 wants to enter into an interest rate swap, the requestor creates a RFQ by populating all relevant fields, with the required swap attributes, and then submits the request to the eligible group of market makers using the smart order routing system. 104. An order routing system 104 identifies one or more market maker 106, 108, 110, 112 capable of responding to the RFQ.

In some implementations, the identified market maker 106, 108, 110, 112 are selected from a group of available market makers. A market maker is a company or individual that enters into either side of a swap. In general, a market maker is a company or individual who is willing, and in some implementations, obligated, to provide a price for a swap.

The market makers 106, 108, 110, 112 provide one or more prices to the order routing system 104. The order routing system 104 displays the price to the requestor 102. The requestor 102 can accept any of the prices provided. The market maker(s) can update their prices at any time prior to the requestor accepting the price.

In some implementations, a time limit can be imposed. The time limit can require that the transaction be completed within a given period of time (for example, 30 seconds, 45 seconds, 1 minute). In some implementations a transaction begins from the time the RFQ is submitted and ends when a price is accepted. The imposition of the time limit allows the market maker to provide prices that can be accepted by the requestor at any time during the time limit without exposing the market maker to undue market risk.

In some implementations, the requestor 102 is provided with an option to remain anonymous, that is, the identity of the requestor 102 is not revealed to the market makers 106, 108, 110, 112. The requestor 102 may also be provided with an option to reveal the identity of the requestor 102 to only the counterparty associated with the price that is accepted by the requestor 102. For example, if the requestor 102 submits a request for a quote anonymously and counterparty 110 provides a quote which is accepted by the requestor 102, the requestor 102 can elect to have his identity provided to the counterparty 110 at that time, however, the requestor's identity would not be provided to the other market maker 106, 108, 112.

Similarly, the market maker can elect to remain anonymous to the requestor 102. The market maker can elect to have their identity never revealed to the requestor 102, to be revealed to the requestor when the market maker submits a price, or may be revealed to the requestor 102 when the requestor accepts the price provided by the market maker.

As more trades occur on electronic exchanges, the ability for third parties to data mine and predict probable courses of action for a requestor also increases. Anonymity is desirable because it limits the ability of a party to analyze patterns of behavior and predict future actions. A party that can predict the future trading activity of other parties may benefit from this knowledge by designing trading strategies that take advantage of this information. By allowing customers to obtain prices without revealing their identity one of three key market data variables is shielded. This increased customer protection will prevent trade information leakage.

In traditional bilateral transactions, where the counterparties are known to each other, each party can evaluate the creditworthiness of the other. However, when the parties are anonymous each party is unable to perform this evaluation. In order to reduce the credit risk associated with anonymous transactions, the requestor 102 and the market maker 106, 108, 110, 112 can have their credit evaluated by the order routing system 104. In some implementations, the order routing system preapproves each party, for example the requestor 102 and the market maker 106, 108, 110, 112, to trade up to a predetermined notional amount.

In some implementations, transactions are not completed unless they are accepted and cleared by clearing house. In general, a clearing house is a financial institution that reduces the risk of one firm failing to honor its transactional obligations. A clearing house may reduce the risks by zeroing out offsetting transaction, requiring collateral, monitoring the credit worthiness of the firms, and/or by providing a guarantee fund that can be used to cover excessive losses.

The system is designed to allow for real time acceptance of trades sent to a clearing house. In some implementations the system can send the trade information to a central clearing house for approval. In this implementation buy orders that are matched to sell orders are routed directly to a clearinghouse where clearing firms have centrally housed individual account limits. In other implementations the system can provide direct access to a customer's clearing firm to establish limits on the trading platform in order to allow pre-trade credit checks to be performed. In this implementation no order could be entered in the system that was in excess of a pre-approved limit. In additional implementations the system can allow for a clearing firm to view their customers' orders that are live in the system and provide that clearing firm with the ability to cancel all resting orders and/or allow for only entry of orders that would be risk reducing if transacted.

Figure 2:
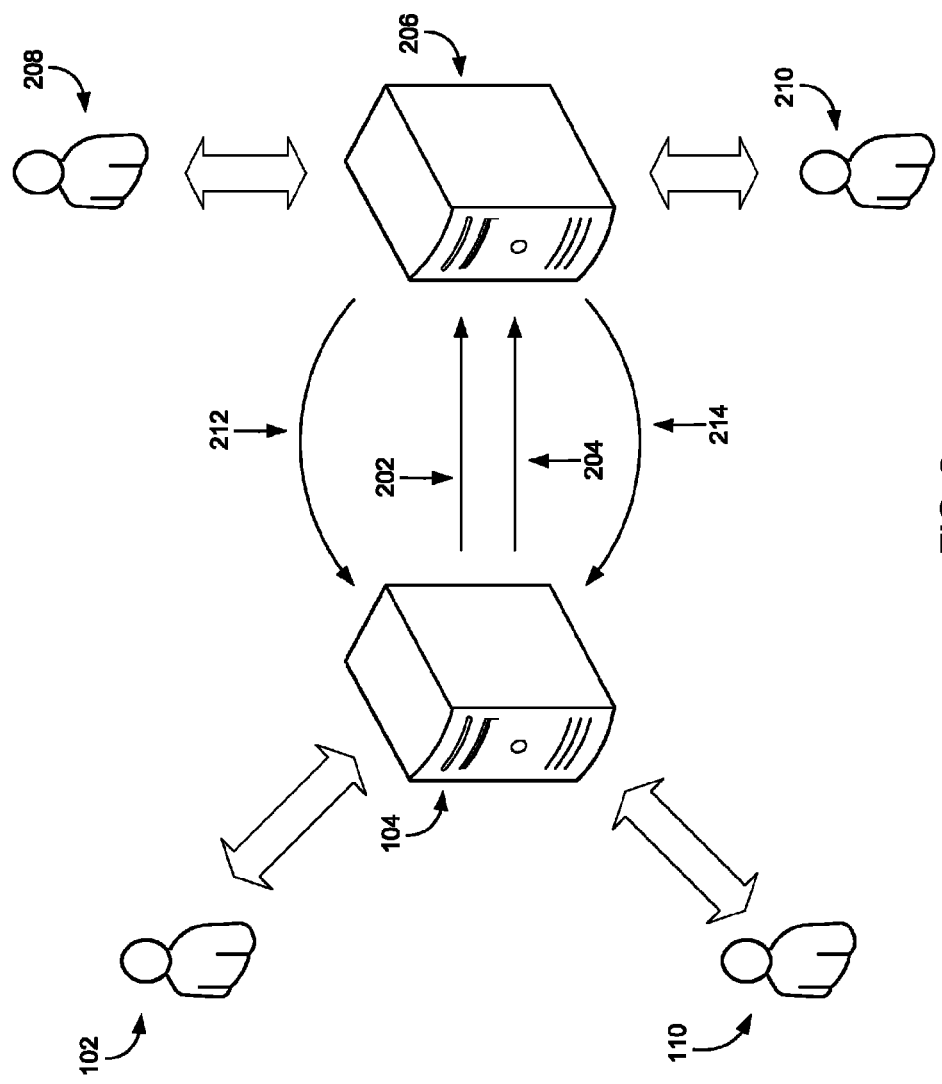
FIG. 2 illustrates submitting a swap transaction to a clearing house.

FIG. 2 illustrates submitting a swap transaction to a clearing house. The order routing system 104 facilitates rapid clearing of transaction by providing an interface to a clearing house 206.

Once a requestor 102 has submitted a request for a quote, a counterparty 110 has supplied a price, and the requestor 102 has accepted the price, the order routing system 104 can provide the necessary information to a clearing house 206 to clear the transaction.

In a traditional system, the requestor 102 would supply a ticket to the clearing house 206 and the counterparty 110 would supply a ticket to the clearing house 206. The clearing house would reconcile the tickets and provide the information to the trader's clearing firm 208 and the counterparty's clearing firm 210.

The order routing system 104 can facilitate easy and efficient clearing of the transaction by providing the requestor's ticket to the clearing house 206, as represented by the arrow 202 and also providing the market maker's ticket to the clearing house 206, as represented by the arrow 204.

Once the clearing house 206 "clears" the transaction and provides notification to the requestor's clearing firm 208 and the market maker's clearing firm 210, the clearing house notifies the order routing system that the transaction has been has been accepted for clearing and is completed, as represented by arrows 212 and 214.

Figure 3:
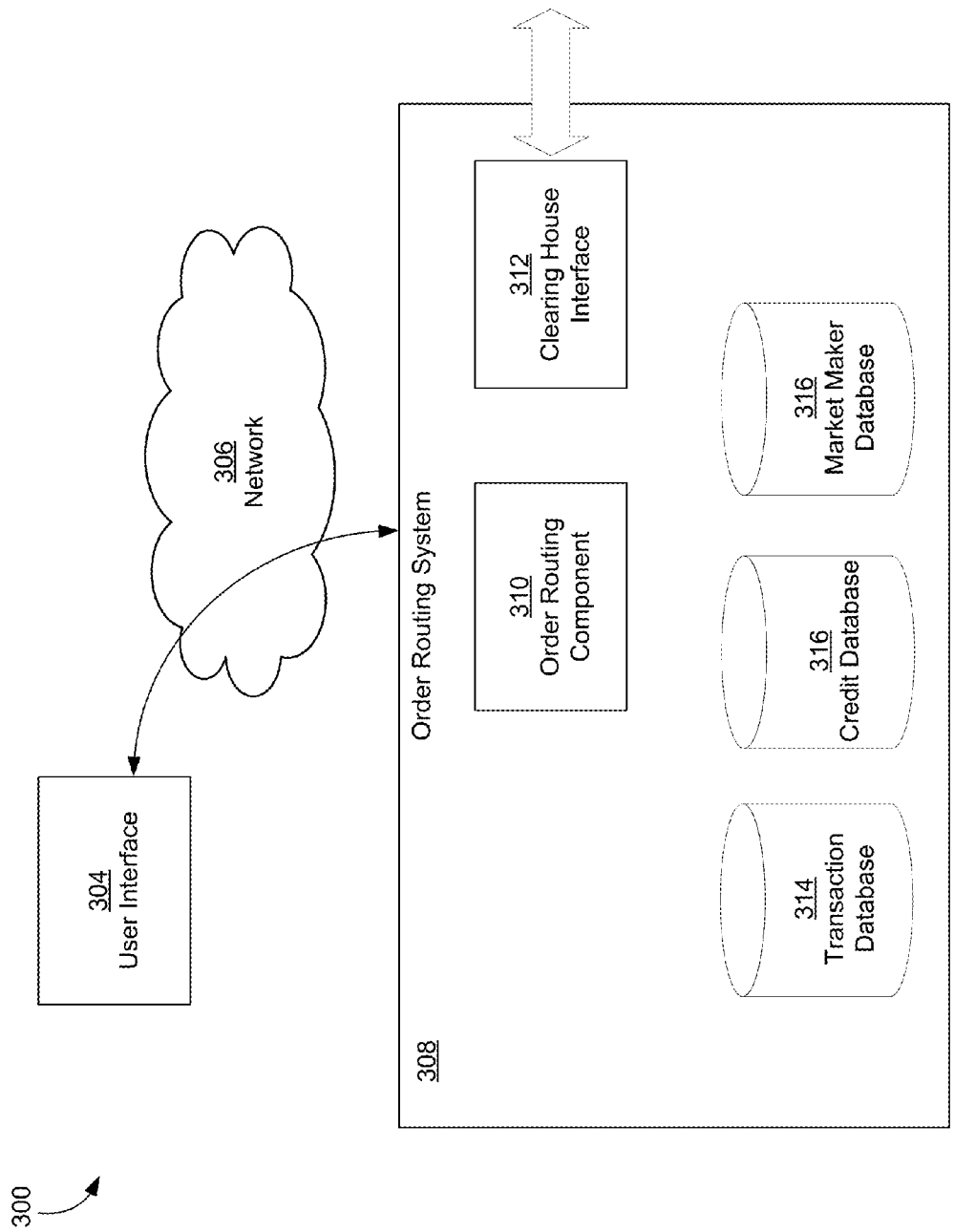
FIG. 3 illustrates an example environment including an order routing system.

FIG. 3 illustrates an example environment 300 including an order routing system 308. Each component, interface, and database of the order routing system may be implemented using one or more computers. In some implementations, each component, interface, and database may reside on a separate computer, grouped together on a single computer, or distributed across multiple computers.

A user interacts with the order routing system 308, through a user interface 304. The user may be, for example, a requestor or a market maker. The user interface 304 can be provided through an application executing on a personal computer, a tablet, a smart phone, or other similar device. The user interface 304 can also be provided as a web page rendered on a browser. The user interface 304 may communicate with the broker system 308 over a network 306, for example, the Internet, a Virtual Private Network (VPN), or a reliable messaging system.

In some implementations, an Order Routing component 310 on the order routing system 308 coordinates transactions between traders and the market makers (not shown). The user interface 304 may be capable of receiving push notifications from the Order Routing component 310. That is, the user interface 304 may receive updates from the Order Routing component 310, for example, updates indicating a change to the status of a request for a quote or a quote. The Order Routing component 310 may also cancel existing RFQs and prices, for example, if a timer expires as described above.

The Order Routing system 308 stores RFQs, prices, and completed transactions in a transaction database 314. The transaction database 314 can store open and closed RFQs, the identity of traders who submit the prices and of the market makers who receive the RFQs, prices submitted in response to receiving a RFQs, successful RFQs which result in a trade cleared by a clearing house, and unsuccessful RFQs which do not result in a trade cleared by a clearing house.

The Order Routing system 308 can verify the credit limit required for each RFQ and compare against a credit database 316. The credit database can include a representation of the notional amount that a given user, or company associated with the user, is entitled to trade. The Order Routing system 308 can enable or disable the ability of any given user or company associated with a user to submit and responds to RFQs.

The Order Routing system 308 can also manage a market maker database 316. The market maker database 316 can include statistics about market makers, including, for example, the total notional amount that a market maker has traded over a period (for example, one month, three months, six months). The market maker database 316 can also include information used by the order routing component 310 to select market makers to receive RFQs submitted by the trader, as described below.

A clearing house interface 312 can be used to submit trade details and receive confirmations and other communications from a clearing house. In some implementations, the clearing house interface 312 communicates with a clearing house using conventional protocols.

Figure 4:
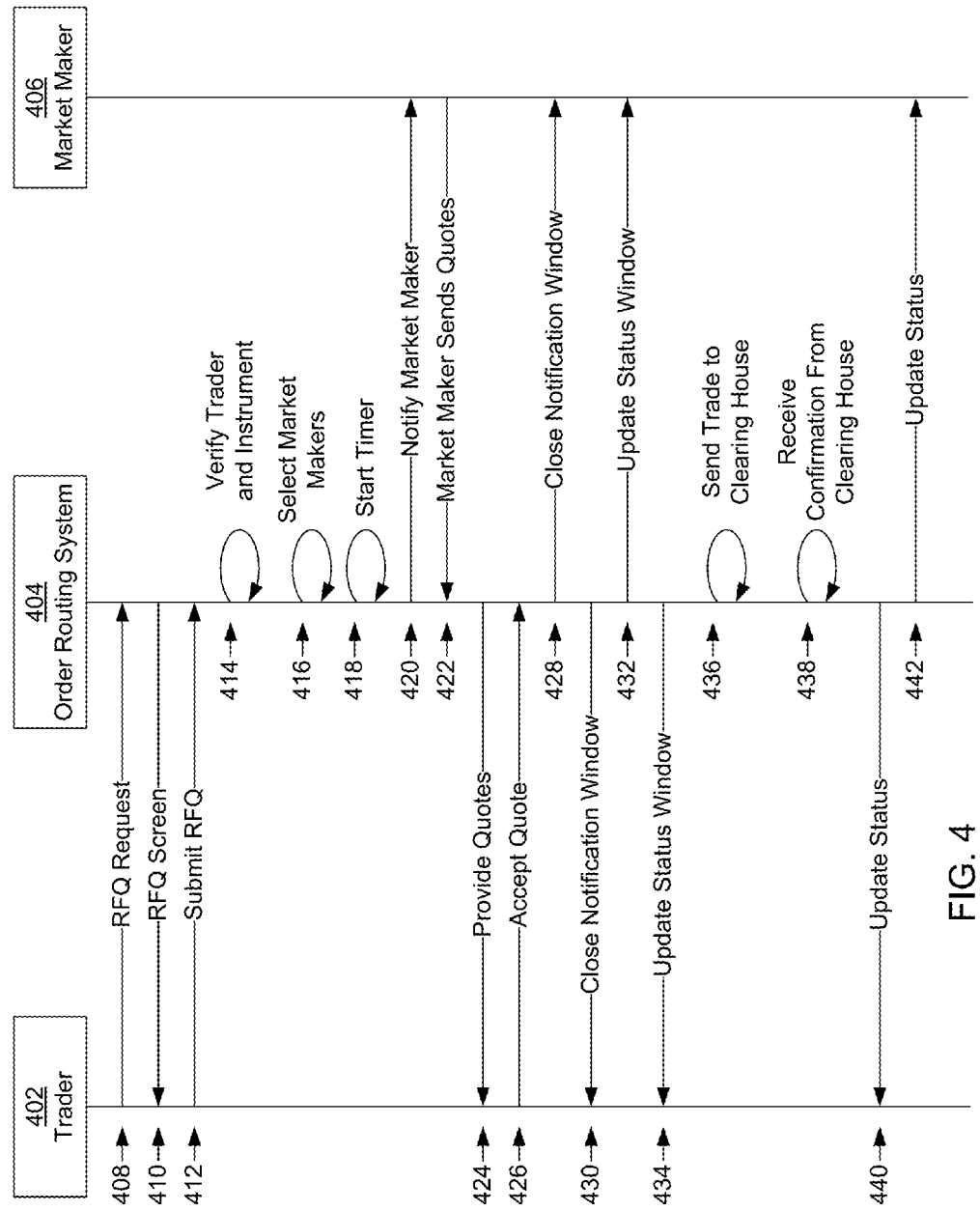
FIG. 4 illustrates an example process for transacting a request for quote.

FIG. 4 illustrates an example process for transacting a RFQ. A requestor 402 requests 408 a RFQ from the order routing system 404. The order routing system presents 410 an RFQ screen to the requestor 402. The RFQ screen provides the requestor 402 with the ability to create a customized swap instrument. In some implementations, the RFQ screen may be requested by selecting a button on a toolbar that is present on the user interface on the requestor's computer, tablet, or similar device. While this process is described in terms of a requestor and a market maker for clarity, the process can apply to any trade between two parties.

The RFQ screen may enable the requestor 402 to select whether the requestor wishes to: (a) remain anonymous throughout the transaction, (b) remain anonymous but reveal his identity to the winning market maker once the transaction is completed, or (c) to display his identity to all the market makers. The RFQ screen may enable the requestor to specify unique trade details such as start date, maturity date, notional amount or economic terms.

The order routing system is designed to send RFQs automatically to the top performing market makers. In some implementations, the requestor can specify which market makers are to receive the RFQ. For example, a requestor may select one, two, or three specific market makers to receive the RFQ. In this implementation the remaining subset of market makers is determined by the smart order routing logic. Alternatively, the requestor can specify that the RFQ should be sent to the full list of market makers.

The requestor submits 412 the RFQ to the order routing system 404. In some implementations, a visual indication (live window) of the RFQ is presented to the requestor until the RFQ is traded, canceled, or times out.

The order routing system verifies 414 the requestor and the swap. Verification of the instrument can include confirming that the swap could clear in a clearing house and verifying that the requestor has sufficient margin or credit limit to engage in the transaction.

Verifying that the swap could clear in the clearing house can include verifying that the clearing house supports the transactions denominated in the selected currency. For example, a clearing house may support swaps denoted in United States dollars but not in Indonesian rupiah, or vice versa.

Verifying that a requestor had sufficient credit can include determining an amount of margin that is required to capitalize the risk associated with the transaction. Once the amount of required capital is determined, the required capital is compared to a pre-approval amount associated with the trader. If the requestor is pre-approved for an amount greater than or equal to the required capital then the RFQ is accepted otherwise the RFQ is rejected.

The order routing system selects 416 the market makers. If the requestor does not specify market markers to receive the RFQ, the order routing system automatically selects the market makers. For example, the order routing system may select the market makers based upon performance metrics.

The market makers can be selected based on the historic performance of the market maker. The order routing system can calculate a performance metric based on the activity level of the market maker on the platform, such as the notional amount that the market maker has traded or the usage fees that the market maker has generated. In some implementations, the performance metric may be calculated on a daily basis. The selection of the market maker may be based on the performance of the market maker over a period of time. For example, the market makers can be selected based on a thirty day moving average of the daily performance metric.

Market makers can also be evaluated by market segments. For example, the interest rate swaps may be categorized based on maturity. In some implementations, the swaps are categorized into three groups: short term, medium term, and long term. For example, short terms swaps may be swaps with a maturity of less than five years. Medium term swaps may be swaps with a maturity of five or more years but less than ten years. Long term swaps may be swaps with a maturity of ten years or more. Performance metrics may be determined for each market maker for each market segment. For example, a market maker may be evaluated based on the thirty day moving average of usage fees generated per day for short term swaps, for medium term swaps, and for long term swaps. For example, the credit default swap market makers can be categorized based upon sectors such as oil and gas, banks and financials, and utilities.

When the order routing system selects the list of market makers, the order routing system can select the highest performing market makers for the market segment of the RFQ. For example, an RFQ with a maturity of four years, the order routing system will select the market makers who have the highest average per day usage fees generated over the last thirty days for transactions in short term swaps.

In some implementations, the order routing system can modify the default market makers. For example, a market maker may be removed from the default list if (a) they request not to receive RFQs; (b) the market maker is not be available to respond to requests, (for example, if the market maker has not logged into the system or has been disabled due to nonperformance), or (c) the market maker becomes overwhelmed because it has received too many RFQs in a short time period.

In scenarios where the requestor selects a number of market makers to receive the RFQ, the order routing system can select additional market makers up to a pre-determined number. For example, if the order routing system is configured to send RFQs to six market makers and the requestor identifies two market makers then the order routing system will select four additional market makers.

In some implementations market makers may also submit a RFQ. In scenarios where the requestor is a market maker, the order routing system will select other market makers to receive the RFQ. In other words, market makers cannot select themselves to provide prices using RFQ.

The order routing system starts 418 a timer. The timer is used to enforce a time limit within which the requestor has to accept prices supplied in response to the RFQ. In some implementations, the timer begins at the time the RFQ is received by the order routing system. In other implementations, the timer begins when the requestor submits the RFQ to the order routing system. If the timer expires, that is, the amount of time that has passed since the timer started is greater than the time limit, then the RFQ and any prices supplied by the market makers are canceled. When a RFQ times out, the requestor may be presented with an opportunity to resubmit the RFQ or create a new RFQ based on the one that timed out.

In some implementations, the amount of time left on the timer is displayed on the requestor and the market makers screens.

The order routing system notifies 420 the market makers 406 about the RFQ. In some implementations, the order routing system causes a window to appear on the user interface of the selected market makers. In some implementations, the order routing system informs the market markers 406 about the total number of market makers who have also received the request. The order routing system can also inform the market makers about the number of market makers who have provided a quote. The order routing system can provide other statistical information about the requestor, for example, the ratio between a number of RFQs that resulted in a completed transaction and a number of the RFQs submitted. In general, details about prices provided by each market maker, such as rates offered, are not visible to the other market makers.

The market makers 422 provide prices to the order routing system. In general, market makers may but are not required to provide prices. In all implementations, the market maker may update or cancel the provided price at any time until the requestor accepts the price or the RFQ times out. In some implementations, prices provided by the market maker are actionable, that is, the price may be accepted and the swap transaction completed without further affirmation by the market maker.

The order routing system provides 424 the requestor with all the prices provided by market makers that respond to the RFQ. In some implementations, the order routing system highlights the best price, that is, the price that is the most financially advantageous to the requestor. The order routing system may include a mechanism, for example, a button "Accept Best", that enables the requestor to easily select the best price. Prices may be continually updated with information provided by the market maker, for example, any update to the price terms.

In scenarios where two market makers provide equivalent prices the order routing system may promote the price from the market maker with the best performance metrics in the market segment.

The market makers and the requestor may be regularly updated with details about the RFQ. In some implementations, updates are provided continually or as close to as the update occurs as practicable.

The requestor accepts 426 a price. In some implementations, a requestor can accept only one price. Upon acceptance of a price, the order routing system closes 428 the notification window of the market makers and closes 430 the notification window of the requestor system.

The order routing system updates 432 a status window of the market maker. Status information that may be provided to the market maker include that the price was accepted; the price provided was the same as the price that was accepted; the price was the second best price provided; the price was the best price provided but a different price was selected; the price was rejected for another price; the RFQ was canceled; and the RFQ timed out.

The order routing system updates 434 a status window of the requestor. The requestor may be made aware of the status of the trade as it is sent to the clearing house.

The order routing system sends 436 the trade to the clearing house. The order routing system receives 438 a confirmation from the clearing house. The order routing system updates 440 the requestor and updates 442 the market maker regarding the status of the transaction.

Figure 5:
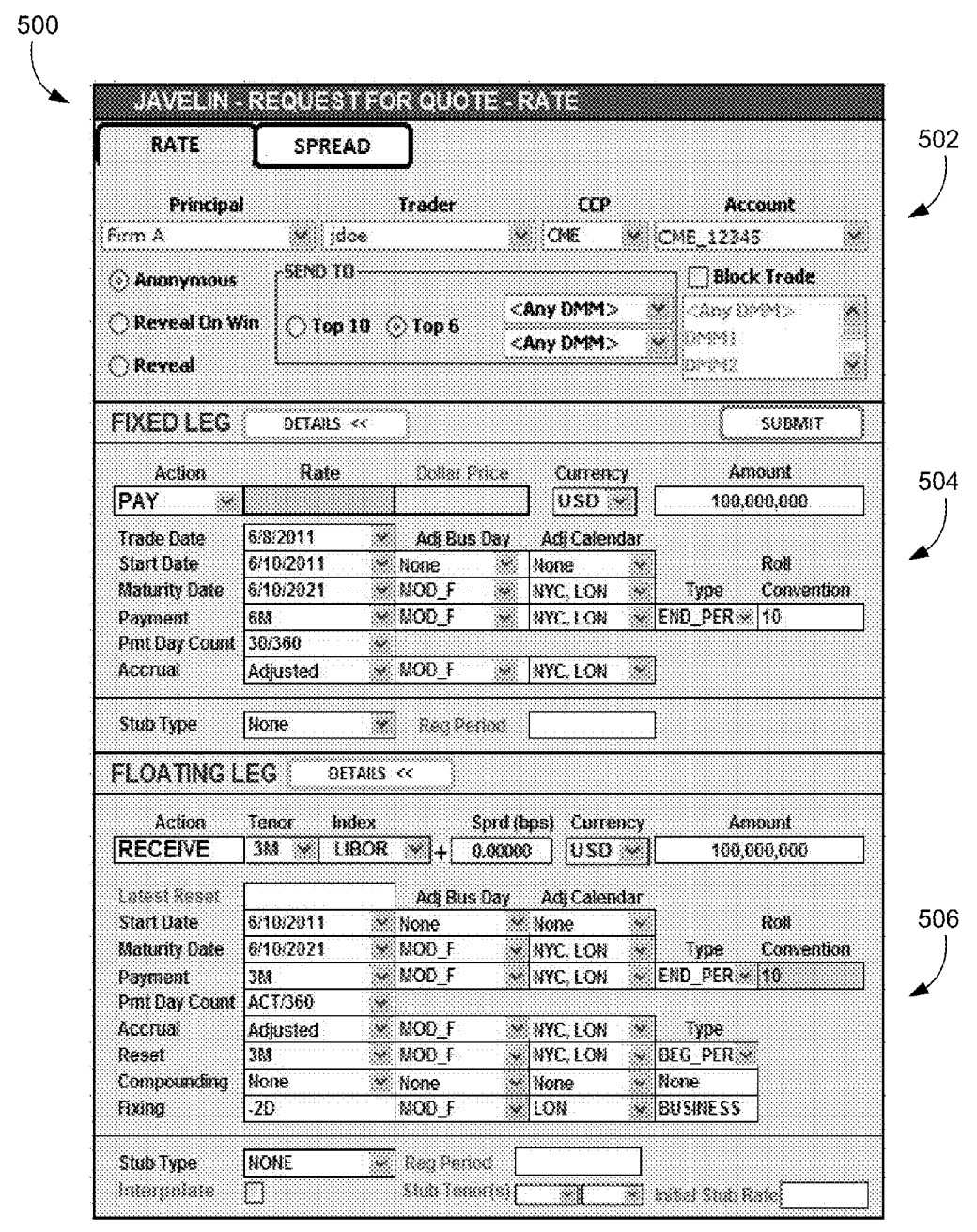

FIG. 5 illustrates a sample user interface 500 for creating a request for a quote. The user interface 500 may, for example, be presented to a requestor when the requestor chooses to create a RFQ. The user interface permits the requestor to specify the details of the RFQ.

The top portion 502 of the user interface 500 includes fields that specify basic information about the RFQ.

In this example, the Principal field is the name of the principal trading firm which is creating the RFQ. In general, requestor will have the name of their firm filled in as a default and cannot change it. In some implementations, where a requestor operates on behalf of multiple firms, the field will be a drop down populated by the names of the firms for which the requestor is authorized to trade.

The Trader field is the identifier of the user who is creating the RFQ. Generally, the Trader is determined based on a security login of the user operating the RFQ screen. In some implementations, a user who is authorized to act on behalf of multiple traders may have a list of authorized trader identifiers.

The CCP (Central Counterparty) field is the clearing house where the order is to be sent for clearing after the trade is executed.

The Account field is an area where a user can select one of multiple accounts used to submit RFQs.

The Anonymous, Reveal on Win, and Reveal fields are radio button where the user can select a requested degree of anonymity. Anonymous is selected by users to remain anonymous. Reveal on Win is selected by users to reveal their identity to the single counterparty when the transaction is completed. Reveal indicates that the user does not wish to be anonymous and shows the user's name to the all of the market makers from the start.

The Block Trade field is selected by the user to designate the trade as a block trade. In general, a block trade is a large transaction which is executed without reporting the transaction to an electronic market, or for which reporting the transaction is delayed by a predetermined time, for example, fifteen minutes.

The Send To field enables the user to select to whom the RFQ is to be sent. In this example, the user can choose to send the RFQ to (a) the top six performing market makers, which is the default setting described above, (b) all the market makers, in this example by checking the "Top 10 DMMs" box, (c) the user can specify one market maker with the system automatically routing to an additional five market makers, or (d) the user can specify two market makers with the system automatically routing to an additional four market makers.

The middle portion 504 of the user interface 500 enables the requestor to specify details about the fixed leg of the RFQ for an interest rate swap.

The Action field indicates if the user wishes to pay a fixed rate or receive a fixed rate.

The Rate field is the price that the requestor wants from the market makers. If user enters a value in this field, then this can also be the rate entered for which the requestor wants the dollar value of the contract.

The Dollar Price field is the dollar price of the contract quoted by the market makers in response to a value entered in the Rate field by the user.

The Currency field is the currency for which notional amount of the fixed leg is denominated.

The Amount field is the notional amount associated with the fixed leg of the RFQ.

The Trade Date field is the date for which the user wishes the transaction to be completed.

The Start Date field is the date for which a swap defined by a completed transaction begins.

The Maturity Date field is the date for which a swap defined by a completed transaction ends.

The Adj Bus Day fields defines how the swap adjusts if the start date or maturity date does not fall on a business day.

The Adj Calendar field defines the calendar(s) that will be applied to the transaction.

The Payment field defines the payment frequency.

The Roll Convention Field specifies the business dates to be used in determining interest accrual calculation periods.

The Pmt Day Count field defines the convention by which days will be counted. The day count allows the user to select any of a number of standard conventions including 30/360 and ACT/360.

The Accrual field allows the user to determine if the accrual method is adjusted or unadjusted if the accrual period end date occurs on a nonbusiness day.

The bottom section 506 of the user interface 504 defines details of the floating leg of the RFQ for an interest rate swap.

The Action field indicates if the user wishes to pay a floating rate or receive a floating rate.

The Tenor field allows the user to specify the floating rate benchmark frequency. For example, the user could specify to use a 1 week, 2 week, 1 month, 2 month, 3 month, 6 month, or 12 month benchmark.

The Index field allows the user to specify the benchmark index. For example, the user may be able to select LIBOR or LIBOR-BBA.

The Sprd (bps) field allows the user to enter a spread to be added to the benchmark index.

The Currency field is the currency for which notional amount of the floating leg is denominated.

The Amount field is the notional amount associated with the floating leg of the RFQ.

The Latest Reset field is the latest reset rate.

The Start Date field is the date for which a swap defined by a completed transaction begins.

The Maturity Datefield is the date for which a swap defined by a completed transaction ends.

The Adj Bus Day fields defines how the swap is to perform if the start date or maturity date does not fall on a business day.

The Adj Calendar field defines the calendar(s) that will be applied to the transaction.

The Payment field defines the payment frequency.

The Day Count field defines the convention by which days will be counted. The day count allows the user to select any of a number of standard conventions including 30/360 and ACT/360.

The Accrual field allows the user to determine if the accrual method is adjusted or unadjusted if the accrual period end date occurs on a nonbusiness day.

The Reset field determines the frequency at which the floating index will be determined.

The Compounding field defines the frequency of compounding.

The Fixing field defines the type of lag to the fixing date. The user may submit the RFQ by clicking on the "SUBMIT" button.

Figure 6:
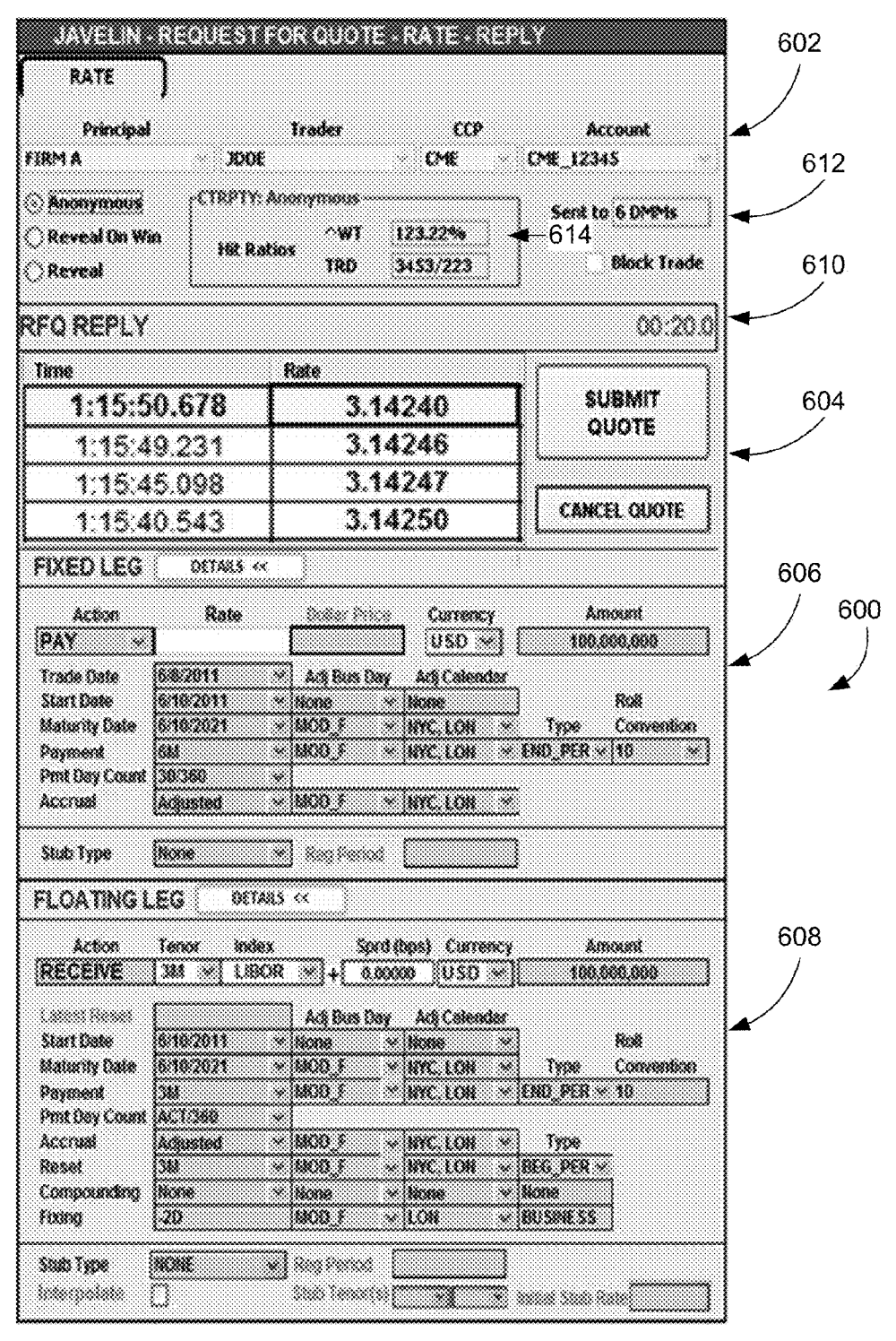

FIG. 6 illustrates an example of a market maker user interface 600 displaying RFQ replies. This user interface 600 may be displayed, for example, to a market marker receiving a RFQ created using the user interface 500 of FIG. 5.

The first portion 602 of the user interface 600 includes fields which provide basic information about the market maker responding to the RFQ. The Principal, Trader, CCP, Account, Anonymous, Reveal on Win, and Reveal fields identify the name and preferences of the market maker but otherwise operate in a similar manner to the fields of the same name defined above with regard to FIG. 5.

The first portion 602 also indicates the number of market makers 612 to whom the RFQ was sent.

The user interface 600 includes a timer 610 which indicates the amount of time remaining to respond to the RFQ. In some implementations, the timer 610 is predominately displayed using a bright color.

The first portion 604 of the user interface 600 includes a trading ratio 614 for the counterparty. As described above, a trading ratio can be a ratio between the number of completed transactions to the number of RFQs sent.

The table in second portion 604 displays the Rate, and a Counterparty associated with prices sent by the market maker in response to the current RFQ.

The market marker can update the price by typing a new rate into the rate field and selecting "Submit Quote". In some implementations, the most recent price may be highlighted to be easily identifiable.

The third portion 606 includes information about the fixed leg of the RFQ as described above.

The fourth portion 608 of the user interface 600 includes information about the floating leg of the RFQ, as described above.

A market maker can respond to the RFQ by selecting the "Submit Quote" button. The market maker can cancel a previously submitted price by either submitting a new price or by selecting the "Cancel Quote" button.

Figure 7:
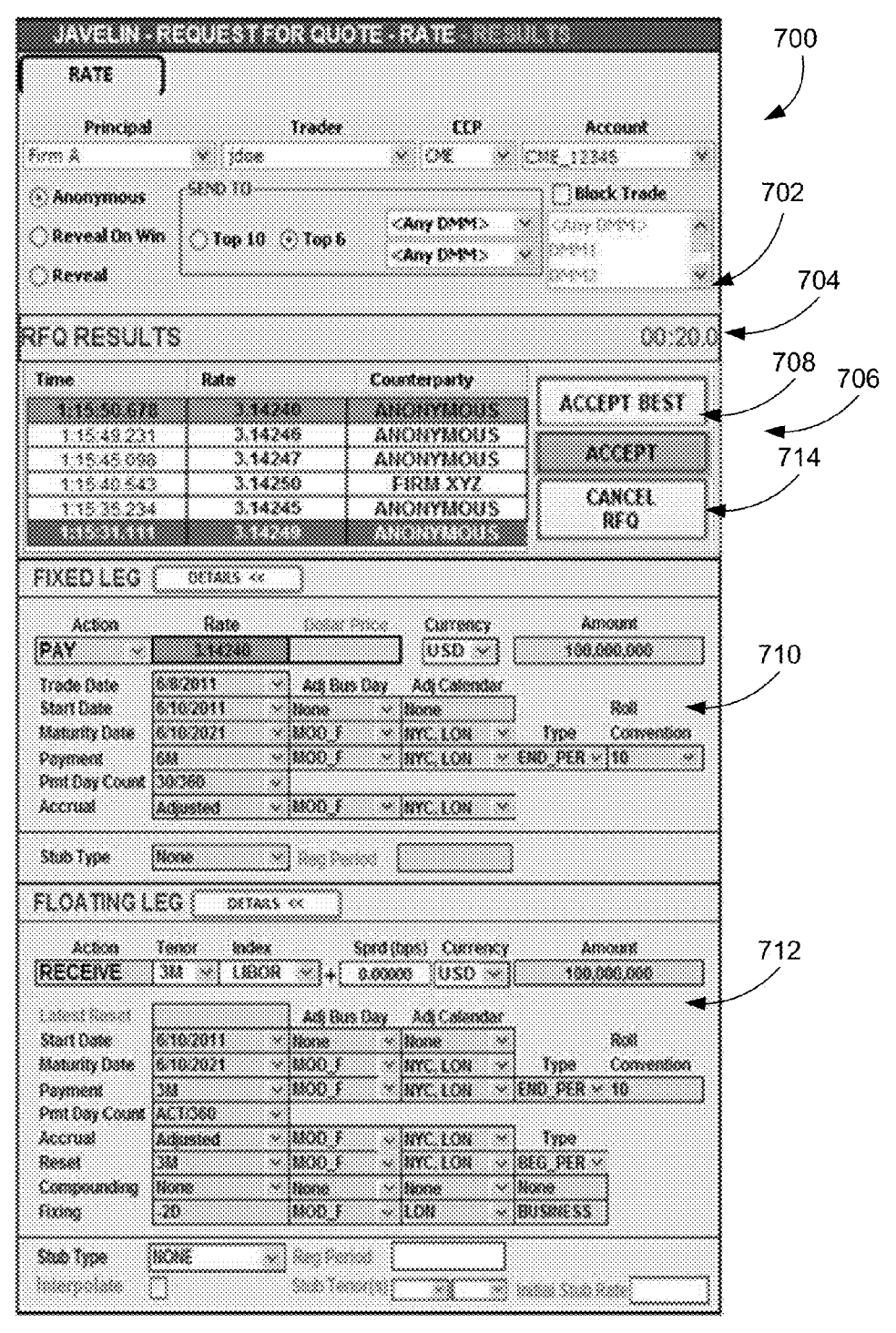

FIG. 7 illustrates an example of a user interface 700 displaying incoming prices to a requesting user. The user interface 700 may be displayed immediately following the submission of the RFQ using, for example, the user interface 500 of FIG. 5.

The first portion 702 of the user interface 700 includes the information about the request for quote as described above with respect to FIG. 5.

The user interface 700 displays a timer 704 that indicates the amount of time remaining to accept a price received in response to the RFQ.

The second portion 706 of the user interface 700 includes a list of prices received from the market makers. The Rate is the interest rate offered by the market maker, the and the Counterparty is the identity of the market making counterparty (responder).

The prices are sorted from the best to the worst. The user interface 700 includes a button "ACCEPT BEST" 708 that when selected automatically accepts the best price. The user interface 700 also includes a button "CANCEL RFQ" 714 that when selected cancels the current RFQ.

Once a price is accepted or the RFQ is canceled the user interface 700 may close.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a trader, embodiments of the subject matter described in this specification can be implemented on a computer having a display device, e.g., a CRT (cathode ray tube) or LCD (liquid crystal display) monitor, for displaying information to the trader and a keyboard and a pointing device, e.g., a mouse or a trackball, by which the trader can provide input to the computer. Other kinds of devices can be used to provide for interaction with a trader as well; for example, feedback provided to the trader can be any form of sensory feedback, e.g., visual feedback, auditory feedback, or tactile feedback; and input from the trader can be received in any form, including acoustic, speech, or tactile input. In addition, a computer can interact with a trader by sending documents to and receiving documents from a device that is used by the trader; for example, by sending web pages to a web browser on a trader's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical trader interface or a Web browser through which a trader can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method useful in protecting privacy by providing anonymous electronic trading comprising:
   preserving the privacy of participants in an electronic trading by routing orders transaction between traders and market makers, comprising:
   receiving, by a computer system over a network connection, a request for quote from a user, the request for quote indicating that the first user is to be anonymous during the negotiation,
   selecting, by the computer system, counterparties to receive the request for quote based on a historic performance metric of that counterparty,
   sending, by the computer system, the request for quote to the selected counterparties absent revealing the identity of the user, the request for quote including non-identifying information about the user,
   receiving, by the computer system, prices from the counterparties, each price associated with a counterparty, and
   presenting the prices to the user;
   wherein the non-identifying information includes a ratio of a historic number of executed transactions to a historic number of submitted requests for quote.

2. The method of claim 1, further comprising:
   verifying the request for quote is clearable.

3. The method of claim 1, further comprising:
verifying that the user is authorized to trade a notional amount;
wherein the request for quote includes the notional amount.

4. The method of claim 1, further comprising:
receiving an acceptance of one of the prices from the user; and
executing a transaction based on the accepted price.

5. The method of claim 4, wherein executing the transaction comprises:
sending a buy ticket to a clearing house; and
sending the sell ticket to a clearing house.

6. The method of claim 4, further comprising:
revealing the identity of the user to the counterparty associated with the accepted price.

7. The method of claim 1, wherein an identity of at least one counterparty associated with a quote is not revealed to the user.

8. The method of claim 1, further comprising presenting a count of the selected counterparties to each counterparty.

9. The method of claim 1, wherein the historic performance metric is a moving average of usage fees generated by the counterparty.

10. The method of claim 1, wherein the historic performance metric is a moving average of volume traded by the counterparty.

11. The method of claim 1, wherein presenting the prices comprises:
determining, for each price, a financial advantage provided to the user by the respective price; and
presenting prices in a sorted order, the sorted order determined at least in part by a financial advantage of the corresponding price.

12. The method of claim 11, wherein presenting the price further comprises:
determining that a first price associated with a first counterparty and a second price associated with the second counterparty offer the same financial advantage; and
ordering the prices based on a historic performance metric of the first counterparty and a historic performance metric of the second counterparty.

13. The method of claim 1, wherein the request for quote is a bespoke transaction.

14. The method of claim 1, wherein the prices represent an offer that can be accepted by the user absent confirmation from the counterparty.

15. The method of claim 14, further comprising:
receiving an updated price from a first counterparty of the counterparties, the updated price replacing the respective price associated with the first counterparty, and
presenting the updated price to the user;
wherein upon receipt of the updated price, the respective price associated with the first counterparty ceases to represent the offer; and
upon presenting the updated price to the user, the updated price represents an offer that can be accepted by the user absent confirmation from the first counterparty.

16. A computer storage medium encoded with computer program instructions useful in protecting privacy by providing anonymous electronic trading that when executed by one or more computers cause the one or more computers to perform operations comprising:
preserving the privacy of participants in an electronic trading by routing orders transaction between traders and market makers, comprising:
receiving a request for quote from a user, the request for quote indicating that the first user is to be anonymous during the negotiation,
selecting counterparties to receive the request for quote based on a historic performance metric of that counterparty,
sending the request for quote to the selected counterparties absent revealing the identity of the user, the request for quote including non-identifying information about the user,
receiving prices from the counterparties, each price associated with a counterparty, and
presenting the prices to the user;
wherein the non-identifying information includes a ratio of a historic number of executed transactions to a historic number of submitted requests for quote.

17. A system useful in protecting privacy by providing anonymous electronic trading comprising:
one or more computers and one or more storage devices storing instructions that are operable, when executed by the one or more computers, to cause the one or more computers to perform operations comprising:
preserving the privacy of participants in an electronic trading by routing orders transaction between traders and market makers, comprising:
receiving a request for quote from a user, the request for quote indicating that the first user is to be anonymous during the negotiation,
selecting counterparties to receive the request for quote based on a historic performance metric of that counterparty,
sending the request for quote to the selected counterparties absent revealing the identity of the user, the request for quote including non-identifying information about the user,
receiving prices from the counterparties, each price associated with a counterparty, and
presenting the prices to the user;
wherein the non-identifying information includes a ratio of a historic number of executed transactions to a historic number of submitted requests for quote.

* * * * *